INVENTOR.
JOSEPH R. GATELY
BY
*Alfred W. Barber*
ATTORNEY

INVENTOR.
JOSEPH R. GATELY
BY
Alfred W. Barber
ATTORNEY

United States Patent Office 3,323,035
Patented May 30, 1967

3,323,035
TRANSISTOR REGULATED POWER SUPPLY
LEAKAGE CURRENT SUPPLY
Joseph R. Gately, Woodside, N.Y., assignor to Forbro Design Corp., New York, N.Y., a corporation of New York
Filed Feb. 6, 1964, Ser. No. 342,905
7 Claims. (Cl. 321—16)

The present invention concerns transistor regulated power supplies and, in particular, methods of and means for supplying the pass transistor $I_{CBO}$.

In a regulated power supply utilizing one or more transistors as regulating pass elements some means must be provided to supply this transistor with collector to base leakage current under all operating conditions other than through the load circuit in order to be able to produce true cut-off conditions. It is preferable to also supply this cut-off condition for the transistor driving the pass transistor as well. In the past the usual way of supplying this current, symbolically designated as $I_{CBO}$, was to provide a reverse polarity voltage source from which branching resistors provide predetermined currents to the bases of the transistors to be supplied.

There has been developed a basic regulated power supply circuit in which in addition to the series pass transistor control an additional or pre-regulating circuit is used to provide more constant power dissipation in the pass transistors. This permits closer design and less expensive pass transistor devices and circuits. A convenient and inexpensive pre-regulator can be provided by means of a silicon controlled rectifier commonly known as an SCR. In such a circuit the input alternating current to the power supply is first transformed to the desired working voltage and then rectified. The rectified voltage now in the form of pulsating direct current is pre-regulated by an SCR which charges a large storage capacitor to a voltage which is controlled in accordance with predetermined conditions of the pass transistor circuit. Under the resulting operating conditions the voltage across the storage capacitor varies widely in response to the control exerted on the SCR and hence, this voltage is unsuited for use to supply the $I_{CBO}$ in the pass transistors. The $I_{CBO}$ control requires an essentially constant voltage.

It has been found in accordance with the present invention, that suitable current for $I_{CBO}$ control can be obtained in the type of circuit described above with the simple addition of a rectifier and a filter capacitor. It has been found that if a rectifier is connected to the pulsating direct current line and to a suitable filter capacitor, a convenient source of $I_{CBO}$ current can be provided. The rectifier has been found to provide an additional condition which permits the voltage on the pulsating direct current line to go to zero, a condition necessary in assuring proper turn-off of the SCR.

Therefore, one object of the present invention is to provide simple, inexpensive and effective method of and means for supplying $I_{CBO}$ to series pass and driver transistors in a regulated power supply utilizing an SCR pre-regulator.

Another object is to supply such $I_{CBO}$ without requiring additional transformer windings.

Still another object is to supply such $I_{CBO}$ without affecting the normal operation of the SCR pre-regulator.

These and other objects will be apparent from the detailed description of the invention given in connection with the various figures of the drawing.

Figure 1:
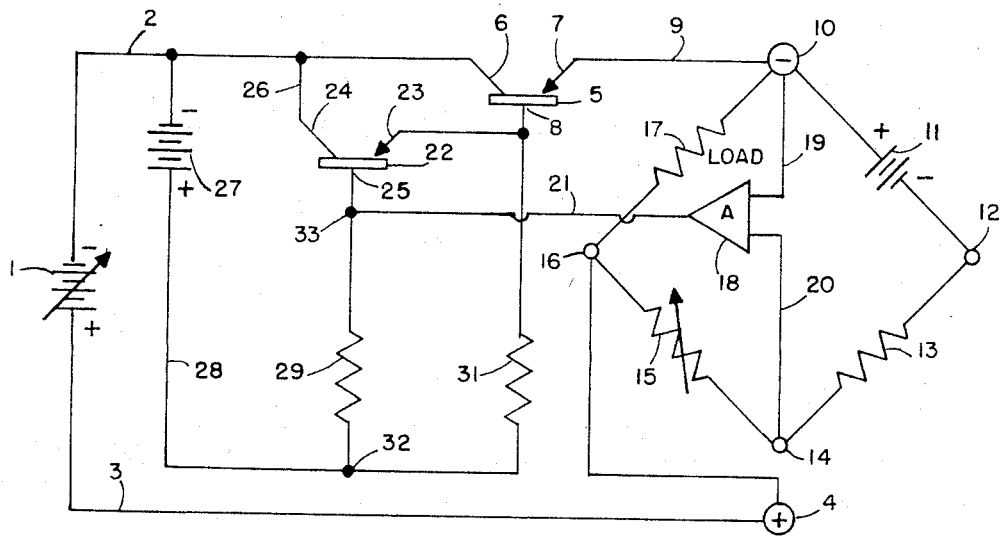
FIGURE 1 is a simplified schematic circuit diagram of the prior art method of supplying counter $I_{CBO}$.

FIG. 1 is a simplified schematic circuit diagram of a prior art regulated power supply utilizing a series pass transistor 5 and a driver transistor 22. A source of unregulated direct current is generally shown by the variable battery 1 which can be taken to represent the usual alternating current transformer rectifier and filter. The direct current from source 1 is applied over leads 2 and 3 to the regulator including series pass transistor 5 and the regulating bridge circuit including load resistor 17 connected between terminals 10 and 16, a source of reference voltage 11 connected between terminals 10 and 12, a reference resistor 13 connected between terminals 12 and 14 and variable voltage control resistor 15 connected between terminals 14 and 16. The error amplifier 18 with its input connected over leads 19 and 20 to bridge terminals 10 and 14 respectively drives base 25 of driver transistor 22 at point 33 over lead 21. Collector 24 of drive transistor 22 is connected to line 2 and emitter 23 is connected to base 8 of pass transistor 5. Collector 6 of pass transistor 5 is connected to line 2 while emitter 7 is connected over line 9 to bridge terminal 10 which is the terminal common to one end of the load, one end of the source of reference voltage and one side of the error amplifier input. The positive end of the load is terminal 16 or terminal 4 connected to the positive side of source 1 over lead 3. The bridge controlled regulated power supply is described in more detail in Patent No. 3,028,538.

Both driver transistor 22 and pass transistor 5 will pass minimum and uncontrolled current from collector to base known as $I_{CBO}$. This limits the minimum voltage or current to which the power supply can be programmed or controlled unless provisions are made for supplying the $I_{CBO}$ without drawing it from the output circuit including the load resistor. One prior art method of supplying $I_{CBO}$ to the driver and pass transistors is to provide a source of relatively constant voltage represented here by battery 27 although in practice usually supplied from an additional input transformer winding connected to a suitable rectifier and filter circuit. The negative end of voltage source 27 is connected to negative line 2 while the positive end is connected over line 28 to junction point 32. From junction point 32 a first $I_{CBO}$ path is provided through current limiting resistor 29 to driver base 25 and a second $I_{CBO}$ path is provided through current limiting resistor 31 to pass transistor base 8. Resistor 29 is chosen to provide a current at least equal to the "worst condition" $I_{CBO}$ of transistor 22 and resistor 31 is chosen to provide a current at least equal to the "worst condition" $I_{CBO}$ of transistor 5.

Figure 2:
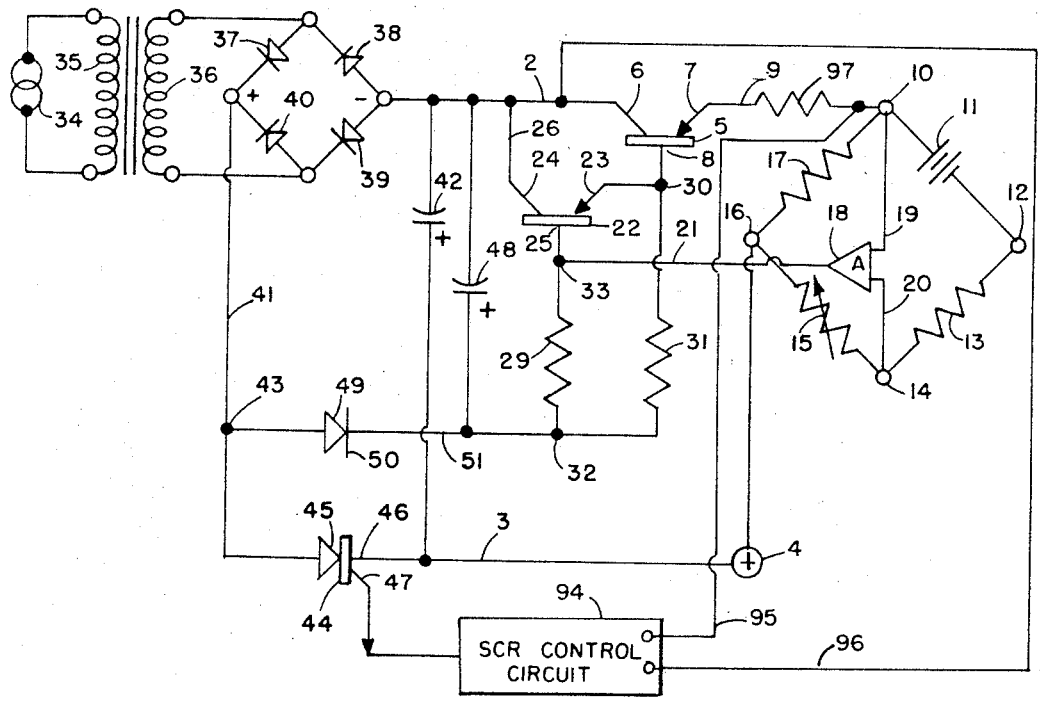
FIGURE 2 is a simplified schematic circuit diagram partly in block form of one form of the present invention.

FIG. 2 is a simplified schematic circuit diagram of one form of the present invention in which the bridge control, driver and pass transistor circuits which may be similar to those of the prior art described above are designated with corresponding numbers. The circuit including the present invention utilizes a power input transformer 35–36 for coupling a source of power 34 to a rectifier bridge including rectifiers 37, 38, 39 and 40. The negative side of the rectifier bridge output is connected to line 2 and the positive side to line 41. The positive line 41 is connected to anode 45 of silicon controlled rectifier (SCR) 44. The cathode 46 is connected to line 3. The gate 47 is connected to a control circuit 94 which is not shown in detail but consists in any suitable phase angle SCR control circuit. The input to the SCR control circuit over lines 95 and 96 receives a voltage provided by the voltage drop from collector 6 to emitter 7 to pass transistor 5 plus the drop across resistor 97 carrying the pass transistor current which is essentially the output load curent so that SCR 44 is controlled to maintain this voltage drop constant and hence to maintain the power dissipation in pass transistor 5 substantially constant. The $I_{CBO}$ supply is provided to junction point 32 by means of rectifier 49–50 and filter capacitor 48. Anode 49 is connected to point 43 on the pulsating direct current positive line 41 and cathode 50 is connected over line 51 to capacitor 48 and $I_{CBO}$ supply point 32. The other side of capacitor 48 is returned to line 2. Thus the positive pulses on line 41 which are of substantially constant amplitude pass through rectifier 49–50 to charge capacitor 48 placing a steady and substantially constant bias on junction 32 for supplying $I_{CBO}$ to driver transistor 22 and pass transistor 5. Rectifier 49–50 has the additional function of allowing the instantaneous voltage on line 41 to go to zero since when the instantaneous voltage on line 41 falls below the steady voltage across capacitor 48, rectifier 49–50 becomes substantially non-conducting and acts like an open switch. The instantaneous voltage on line 41 which is the instantaneous voltage at SCR anode 45 must fall to zero at each half cycle of the power line alternating current in order to render the SCR non-conducting periodically and hence controllable. The SCR is controlled to charge energy storage capacitor 42 which in turn supplies low ripple output to terminal 4.

Figure 3:
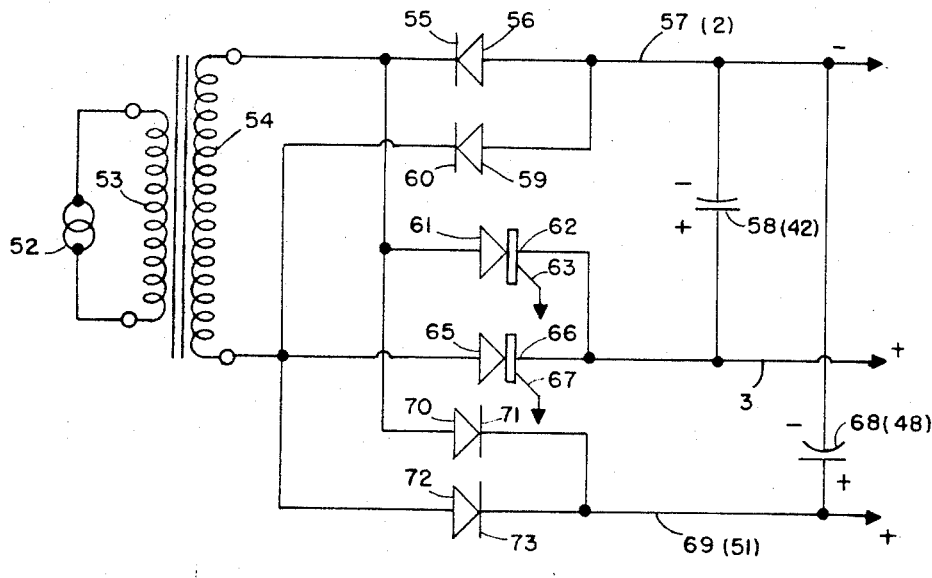
FIGURE 3 is a schematic circuit diagram of a portion of a regulated power supply utilizing a modified form of the present invention.

FIG. 3 is a schematic circuit diagram of an alternate form of power transformer, power rectifier, SCR and $I_{CBO}$ rectifiers suitable for use in accordange with the present invention. The power transformer includes a primary 53 connected to a source of alternating current power 52, and a secondary 54 connected to the rectifier system. On one half of the input alternating current cycle cathode 55 will be negative passing current to anode 56 and negative line 57 (corresponding to 2 FIG. 2) while anode 65 will be positive and will pass positive current to cathode 66 and line 3 in accordance with SCR control signals (94 of FIG. 2) and energy storage capacitor 58 (42 in FIG. 2) will receive a controlled charge. On the second half of the input alternating current cycle cathode 60 will be negative passing current to anode 59 and negative line 57 while anode 61 will be positive and will pass positive current to cathode 62 and line 3 in accordance with the SCR control signals and energy storage capacitor 58 will receive a further controlled charge. The $I_{CBO}$ circuit in this case includes filter capacitor 68 (48 in FIG. 2) which is charged through two rectifiers, one with anode 70 connected to SCR anode 61 and cathode 71 connected to $I_{CBO}$ bias line 69 (51 in FIG. 2), and the other with anode 72 connected to SCR anode 65 and cathode 73 connected to line 69. Thus lines 57 (2) and 3 supply direct current for regulation and utilization and line 69 (51) supplies positive voltage for $I_{CBO}$ in the manner described in detail in connection with FIG. 2.

Figure 4:
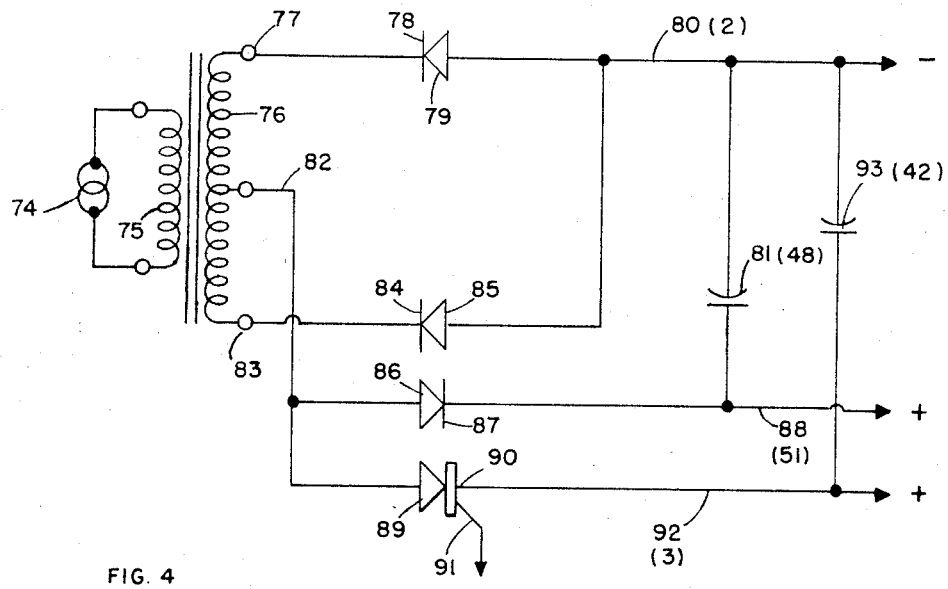
FIGURE 4 is a schematic circuit diagram of a portion of a regulated power supply utilizing a second modified form of the present invention.

FIG. 4 is a further modified rectifier and SCR circuit which may be utilized in accordance with the present invention. In this case the input transformer includes a primary 75 connected to a source of alternating current 74 and a secondary 76 with end points 77 and 83 and center tap 82. The negative end of the rectifying circuit is provided by the connection of end point 77 to rectifier cathode 78, anode 79 to negative line 80 (2 in FIG. 2), end point 83 to rectifier cathode 84, anode 85 to negative line 80, and center tap 82 to SCR anode 89 and cathode 90 to positive line 92 (3 in FIG. 2). Energy storage capacitor 81 is connected from positive line 92 to negative line 80. Pre-regulation by means of the SCR control (94 in FIG. 2) not shown but connected to gate 91. The $I_{CBO}$ positive voltage in this circuit is provided by rectifier 86–87 with its anode 86 connected to center tap 82 and its cathode 87 connected to filter capacitor 81 (48 in FIG. 2) and $I_{CBO}$ current supply line 88 (51 in FIG. 2). The functioning of the circuits of FIGS. 3 and 4 to supply $I_{CBO}$ is essentially the same as that of the circuit of FIG. 2 described in detail above.

The circuits of FIGS. 2, 3 and 4 show or assume the use of PNP transistors as pass and driver transistors. The circuits are equally useful with NPN pass and driver transistors by merely reversing polarities where necessary.

While only a few forms of the present invention have been shown and described, many modifications will be apparent to those skilled in the art and within the spirit and scope of the invention as set forth in particular in the appended claims.

What is claimed is:

1. In a regulated power supply including in combination;
   a four arm bridge including, a reference voltage arm, a reference resistor arm, a variable resistor voltage control arm, and a load resistor arm connected in a closed loop in the order named;
   means for developing unregulated D.C. voltage including a line transformer connected to rectifying means providing a two terminal source of unregulated direct current;
   a series pass transistor and a resistor connected in series between one of said terminals and the bridge junction which is between one end of the load resistor and one end of the reference voltage to partially control the current supplied from said unregulated source to said load;
   an error amplifier with the input connected between the said bridge junction and the bridge junction which is between one end of the reference resistor and the voltage control resistor and with the output coupled in controlling relationship to said pass transistor;
   a switching semiconductor connected between the other terminal of said source and the other end of the load resistor for partially controlling the current supplied from said unregulated source and said load;
   a control circuit for said switching semiconductor connected across said series pass transistor and series connected resistor to provide an input circuit and output connected in controlling relationship to said switching semiconductor to provide control of said regulated D.C. in a direction to tend to keep the voltage drop across said pass transistor and series connected resistor in series combination substantially constant;
   whereby the switching regulator acts to tend to keep the dissipation in said series pass transistor constant by the operation of the switching semiconductor controlled in accordance with the voltage across the series pass transistor plus a function of the current through the series pass transistor.

2. A regulated power supply as set forth in claim 1 and including a rectifier connected from the junction between said switching semiconductor and said other terminal to one end of a filter capacitor, resistive means connected between this said end of the filter capacitor and the control means of said series pass transistor to supply leakage current thereto and a return path between the other end of said filter capacitor and the connection between said series pass transistor and said source of unregulated voltage whereby said rectifier serves to keep said capacitor charged for supplying said leakage current in a substantially steady flow.

3. A regulated power supply as set forth in claim 1 wherein said rectifying means is a bridge rectifier.

4. A regulated power supply as set forth in claim 1 and including an energy storage capacitor connected from the load end of said switching semiconductor and the end of said series pass transistor which is connected to said rectifying means.

5. A regulated power supply as set forth in claim 1 and including a driver transistor connected between the output of said error amplifier and said pass transistor for increasing the current drive sensitivity of said controlling relationship.

6. A regulated power supply as set forth in claim 1 wherein said switching semiconductor is a silicon controlled rectifier.

7. A regulated power supply as set forth in claim 1 and including a rectifier connected from the junction between said switching semiconductor and said other terminal to one end of a filter capacitor, resistive means connected between this said end of the filter capacitor and the control means of said series pass transistor to supply leakage current thereto, a return path between the other end of said filter capacitor and the connection between said series pass transistor and said source of unregulated voltage whereby said rectifier serves to keep said capacitor charged for supplying said leakage current in a substantially steady flow and a driver transistor connected between the output of said error amplifier and said series pass transistor for increasing the current drive to said series pass transistor and means connected to said capacitor for supplying leakage current to said driver transistor.

References Cited

UNITED STATES PATENTS

| | | | |
|---|---|---|---|
| 2,858,499 | 10/1958 | Silver | 321—19 |
| 3,040,235 | 6/1962 | Schemel et al. | 321—19 |
| 3,106,674 | 10/1963 | Hamilton | 323—22 |
| 3,207,973 | 9/1965 | Smith | 321—18 |
| 3,218,542 | 11/1965 | Taylor | 323—22 |
| 3,258,678 | 6/1966 | Legatti | 323—22 |
| 3,260,920 | 7/1966 | Shoemaker | 321—19 |

OTHER REFERENCES

Electronics, Mar. 9, 1962, Tk7800 E58, pp. 62-64.

JOHN F. COUCH, *Primary Examiner.*

M. L. WACHTELL, *Assistant Examiner.*